United States Patent [19]

Kreyenborg

[11] Patent Number: 5,607,583
[45] Date of Patent: Mar. 4, 1997

[54] FILTER DEVICE FOR EXTRUDERS AND INJECTION-MOLDING MACHINES

[75] Inventor: Jan-Udo Kreyenborg, Munster, Germany

[73] Assignee: Kreyenborg, Inc., Norcross, Ga.

[21] Appl. No.: 620,138

[22] Filed: Mar. 21, 1996

[30] Foreign Application Priority Data

Jul. 3, 1995 [DE] Germany ............ 195 24 140.1

[51] Int. Cl.$^6$ .............. B29C 45/58; B29C 47/68
[52] U.S. Cl. .............. 210/236; 210/447; 425/185; 425/190; 425/199
[58] Field of Search ............ 425/185, 190, 425/197, 198, 199; 210/236, 447

[56] References Cited

U.S. PATENT DOCUMENTS

| | | | |
|---|---|---|---|
| 4,701,118 | 10/1987 | Koching et al. | 425/198 |
| 4,725,215 | 2/1988 | Kreyenborg et al. | 425/198 |
| 5,417,856 | 5/1993 | Bacher et al. | 425/199 |

FOREIGN PATENT DOCUMENTS

| | | |
|---|---|---|
| 2836847 | 3/1980 | Germany . |
| 2942849 | 5/1981 | Germany . |

*Primary Examiner*—Jay H. Woo
*Assistant Examiner*—Joseph Leyson
*Attorney, Agent, or Firm*—Merchant, Gould, Smith, Edell, Welter & Schmidt, P.A.

[57] ABSTRACT

The invention relates to a filter device for extruders and injection-molding machines for the continuous processing of thermoplastic, the throughflow bore in the screen plunger being of a round design in the region of the inlet side and of the screen chamber and narrowing ovally following on from the rear side of the screen pack, the long axis of the oval extending in the direction of the displacement direction of the screen plunger.

3 Claims, 1 Drawing Sheet

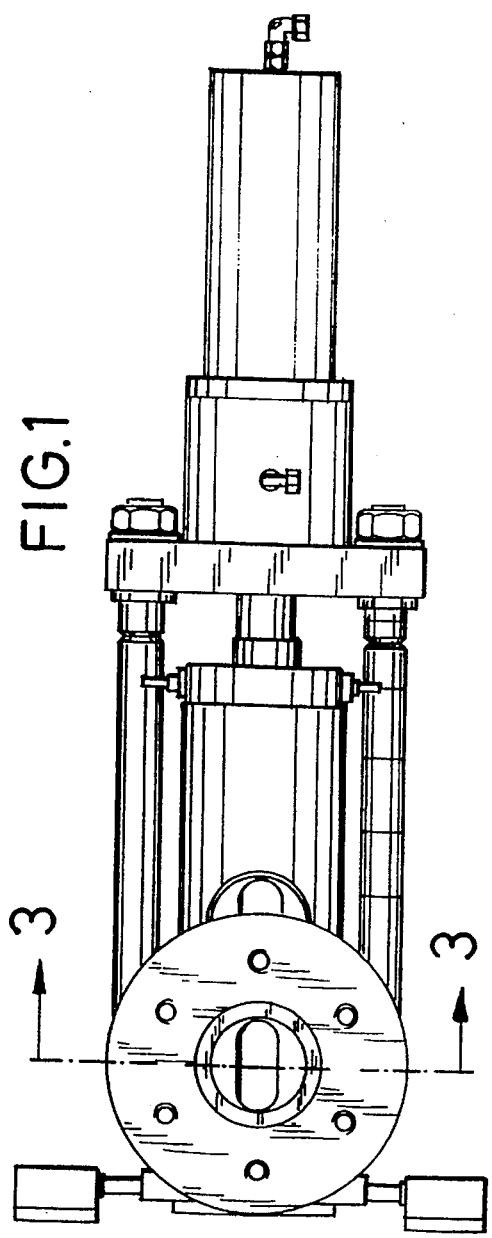
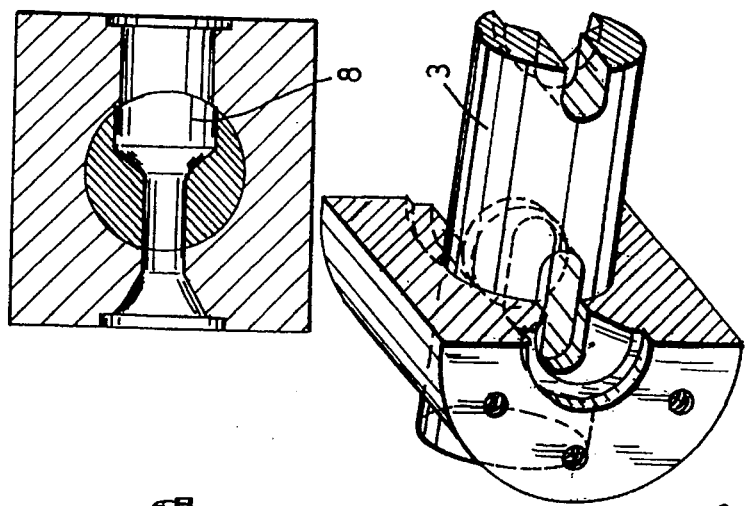
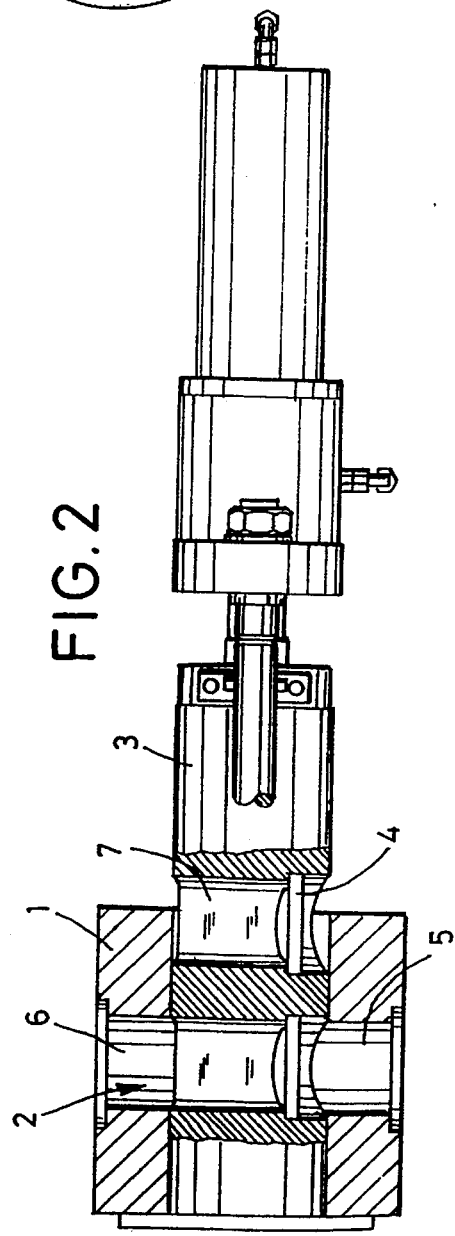

FILTER DEVICE FOR EXTRUDERS AND INJECTION-MOLDING MACHINES

BACKGROUND OF THE INVENTION

1. Field of the Invention

The invention relates to a filter device for extruders and injection-molding machines for the continuous processing of thermoplastic, having a screen plunger which can be displaced perpendicularly with respect to the direction of transport of the plastic, is arranged in a suction-tight manner in a housing bore and has a plurality of screen packs and vent grooves arranged in successive screen chambers.

2. Description of the Prior Art

A generic device is described in DE 29 42 849 C2. Proposed here is a continuous displacement of the screen plunger through the extruder bore in such a way that the pressure downstream of the screen plunger, i.e. downstream of the screen pack, is kept constant.

In the case of this known device, although for a short time two screen chambers and the throughflow bores following on therefrom are in use, it is not envisaged that flow is introduced into the two throughflow bores over a prolonged period.

In DE 28 36 847 A1 there is described a multi-screw extruder with a screen changing device, in which the two bores, flowing one into the other, of the two screws merge into an outlet bore in a rheologically favorable way, this outlet bore, which is of an elongate design, being fanned out into die bores. The object of this known device, and the solution achieving it, is the transition of the opening from a multi-screw extruder into an outlet opening adjoined by die openings. The transition is intended to follow a rheologically favorable path.

SUMMARY OF THE INVENTION

The invention is based on the object of providing an arrangement in which two throughflow bores can be used, even over a prolonged period, without great drops in pressure being able to occur, the device according to the invention relating to thermally stable plastics, such as polyethylene for example.

The object on which the invention is based is achieved by the throughflow bore in the screen plunger being of a round design in the region of the inlet side and of the Screen chamber and narrowing ovally following on from the rear side of the screen pack, the long axis of the oval extending in the direction of the displacement direction of the screen plunger.

Advantageous refinements are explained in the subclaims.

In other words, it is proposed that, in a manner known per se, the inflow opening of the screen plunger up to the screen pack, and including the screen pack, is of a round design, but that then the throughflow channel or the throughflow bore narrows such that the free cross section of this throughflow bore then corresponds approximately to the free cross section of the screen pack. In this arrangement, the oval outflow openings of the throughflow bores extend in the direction of the displacement direction of the screen plunger, with the result that these outflow openings thus come into contact very quickly with the neighboring outlet bore when the screen plunger is displaced.

BRIEF DESCRIPTION OF THE DRAWINGS

An exemplary embodiment of the invention is explained below with reference to the drawing, in which:

FIG. 1 shows a view of a screen plunger designed according to the invention,

FIG. 2 shows a section through the screen plunger and in plan view,

FIG. 3 shows a section according to the line 3–3 in FIG. 1 and

FIG. 4 shows a graphic representation of the screen plunger to illustrate the shaping of the through-flow bore.

DESCRIPTION OF PREFERRED EMBODIMENTS

In the drawing, 1 denotes a housing which has a housing bore 2, which is defined by an inlet channel 5 and an outlet channel 6. 3 Denotes a screen plunger, which can be displaced transversely with respect to the housing bore 2 and has a plurality of throughflow bores arranged one behind the other in the displacement direction. Arranged in the screen plunger 3 in the region of the inlet channel 5 are screen packs 4, and in this region the inlet opening of the throughflow bore 7 is of a round design and then narrows to an oval outflow opening—as FIG. 4 clearly shows—which extends in the direction of the displacement direction of the screen plunger.

In FIG. 3, the screen chamber 8 formed in the region of the screen pack can be seen and the narrowing of the throughflow bore 7 can be seen.

I claim:

1. A filter device for extruders and injection-molding machines for the continuous processing of thermoplastic, comprising a screen plunger perpendicularly displaceable with respect to a direction of transport of the plastic, arranged in a suctiontight manner in a housing bore and having a plurality of screen packs arranged in successive screen chambers, each defined by a throughflow bore in the screen plunger, each throughflow bore having a round cross-section in a region of an inlet side and of the screen chamber and narrowing to form an oval cross-section on a rear side of the screen pack, the oval cross-section having a long axis extending along a displacement direction of the screen plunger.

2. The filter device as claimed in claim 1, wherein the throughflow bore has an oval opening defined by said oval cross-section corresponding in area approximately to a clear area of the screen pack.

3. The filter device as claimed in claim 1, wherein two of said throughflow bores are spaced apart so as to receive flow simultaneously into the two throughflow bores and their corresponding screen packs.

* * * * *